US012763996B1

(12) United States Patent
Biswas et al.

(10) Patent No.: US 12,763,996 B1
(45) Date of Patent: Oct. 13, 2026

(54) DECISION FEEDBACK EQUALIZATION CIRCUIT

(71) Applicant: Cadence Design Systems, Inc., San Jose, CA (US)

(72) Inventors: Riju Biswas, Noida (IN); Swarajit Manna, State-West Bengal (IN)

(73) Assignee: Cadence Design Systems, Inc., San Jose, CA (US)

( * ) Notice: Subject to any disclaimer, the term of this patent is extended or adjusted under 35 U.S.C. 154(b) by 351 days.

(21) Appl. No.: 18/466,928

(22) Filed: Sep. 14, 2023

(51) Int. Cl.
*H03H 7/30* (2006.01)
*H04L 25/03* (2006.01)

(52) U.S. Cl.
CPC .............................. *H04L 25/03057* (2013.01)

(58) Field of Classification Search
CPC ................................................ H04L 25/03057
USPC ........................................................ 375/233
See application file for complete search history.

(56) References Cited

U.S. PATENT DOCUMENTS

| | | | | |
|---|---|---|---|---|
| 6,665,308 B1 * | 12/2003 | Rakib | H04L 27/362 | 370/479 |
| 7,539,243 B1 * | 5/2009 | Toifl | H04L 25/03057 | 327/554 |
| 9,184,763 B2 * | 11/2015 | Kuttner | H04B 1/04 | |
| 9,231,793 B1 * | 1/2016 | Vareljian | H04L 25/03057 | |
| 9,369,313 B1 * | 6/2016 | Yu | H03F 1/0205 | |
| 2008/0198916 A1 * | 8/2008 | Zeng | H04L 25/03057 | 375/233 |
| 2010/0202506 A1 * | 8/2010 | Bulzacchelli | H04L 25/03267 | 375/233 |
| 2014/0347203 A1 * | 11/2014 | Kuttner | H04B 1/04 | 341/150 |
| 2024/0348260 A1 * | 10/2024 | Nandi | H03M 1/66 | |

* cited by examiner

*Primary Examiner* — Helene E Tayong
(74) *Attorney, Agent, or Firm* — Mark H. Whittenberger; Holland & Knight LLP

(57) ABSTRACT

The present disclosure relates to circuits and methods for decision feedback equalization. Embodiments may include a sum amplifier and a tap network in electrical communication with the sum amplifier. Embodiments may further include a single slicer in electrical communication with the tap network. The single slicer may include at least one capacitive digital-to-analog converter configured to provide capacitive feedback to a source of the single slicer.

16 Claims, 20 Drawing Sheets

400

600

700

1000

1400

2000

DECISION FEEDBACK EQUALIZATION CIRCUIT

FIELD OF THE INVENTION

The present disclosure relates to circuits and, more particularly, to decision feedback equalization.

DISCUSSION OF THE RELATED ART

Serial data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments may lead to transmission errors. The quality of a channel can determine an upper limit on its achievable rate. Additionally, other impairments in a serial data link can degrade overall system performance. For instance, circuit non-idealities can also cause a degradation in a system's performance. Overall, minimizing impairments can enable a channel to reach or achieve higher link rates.

SUMMARY

In one or more embodiments of the present disclosure, a decision feedback equalization circuit is provided. The circuit may include a sum amplifier and a tap network in electrical communication with the sum amplifier. The circuit may further include a single slicer in electrical communication with the tap network. The single slicer may include at least one capacitive digital-to-analog converter configured to provide capacitive feedback to a source of the single slicer.

One or more of the following features may be included. The at least one capacitive digital-to-analog converter may include a P-side capacitive digital-to-analog converter and an N-side capacitive digital-to-analog converter. The at least one capacitive digital-to-analog converter may be configured to select between a first code and a second code based on previously received data. Capacitive feedback may be provided to the source of the single slicer without providing feedback to the sum amplifier. The single slicer may utilize a quarter rate clocking scheme. The at least one capacitive digital-to-analog converter may further include a second P-side capacitive digital-to-analog converter and/or a second N-side capacitive digital-to-analog converter. The circuit may include a data path and/or an edge path, wherein each of the data path and edge path may include four slicers.

In one or more embodiments of the present disclosure, a decision feedback equalization method is provided. The method may include electrically connecting a sum amplifier, a tap network and a single slicer. The method may further include providing capacitive feedback to a source of the single slicer using at least one capacitive digital-to-analog converter associated with the single slicer.

One or more of the following features may be included. The at least one capacitive digital-to-analog converter may include a P-side capacitive digital-to-analog converter and an N-side capacitive digital-to-analog converter. The method may further include selecting between a first code and a second code based on previously received data using the at least one capacitive digital-to-analog converter. The method may also include providing capacitive feedback to the source of the single slicer without providing feedback to the sum amplifier. The single slicer may utilize a quarter rate clocking scheme. The at least one capacitive digital-to-analog converter may further include a second P-side capacitive digital-to-analog converter and/or a second N-side capacitive digital-to-analog converter. The method may further include providing a data path and/or an edge path, wherein each of the data path and edge path include four slicers.

In one or more embodiments of the present disclosure, a decision feedback equalization circuit is provided. The circuit may include a tap network and a single sum amplifier in electrical communication with the tap network. The circuit may further include a plurality of flip-flops configured to receive an input from the single sum amplifier. The circuit may also include a first level of multiplexers configured to receive an input from the plurality of flip-flops and a second level of multiplexers configured to receive an input from the first level of multiplexers.

One or more of the following features may be included. The second level of multiplexers may provide an output back to the single sum amplifier. The first level of multiplexers may include a plurality of multiplexers. The second level of multiplexers may utilize an XOR based clocking scheme. The second level of multiplexers may include a single multiplexer. The plurality of flip-flops may use a NOR based clocking scheme.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION

Figure 1:
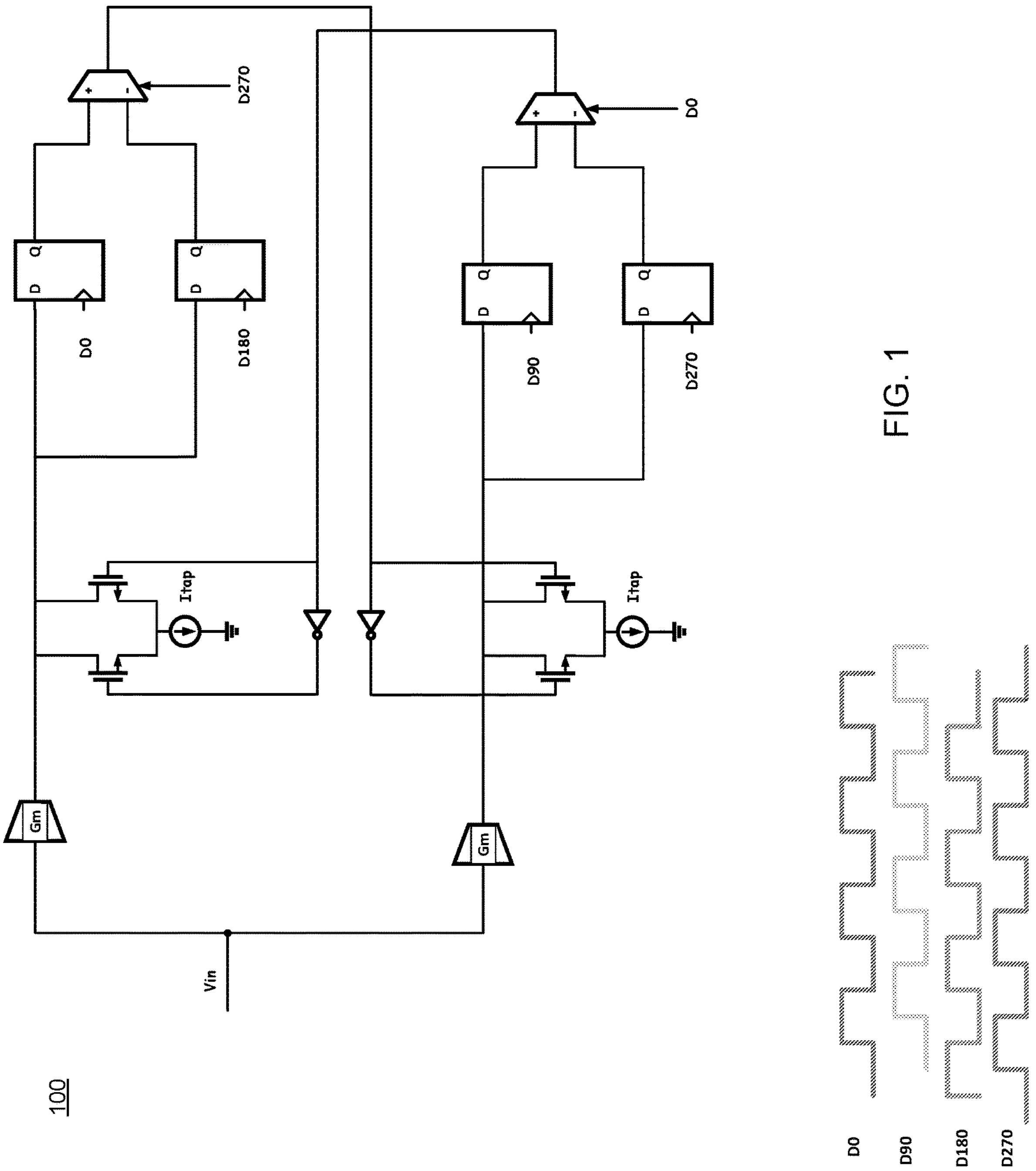
FIG. 1 shows an example quarter rate decision feedback equalization architecture with two sum amplifiers consistent with embodiments of the present disclosure.

Various embodiments provide for quarter-rate data sampling with direct feedback decision feedback equalization. For some embodiments, the quarter-rate data sampling described herein may be part of a circuit for high-speed serial data communication, such as a serializer/deserializer (SerDes) circuit.

Traditionally, a data receiver comprises data comparators, clock comparators, and error comparators, each of which uses a circuit to sample a received data signal. Both data comparators and clock comparators may be used to quickly and reliably sample a received data signal. For example, a data comparator may sample the eye of a received data signal at its center and recover a data stream. For a circuit using a loop-unrolled Decision Feedback Equalizer (DFE) (also referred to as an unrolled DFE), at least two data comparators operating at different threshold voltage values may be used. A clock comparator, which may sample the eye at its edges, may be used to perform clock recovery and alignment at the data receiver. In contrast, an error comparator is often used to measure the eye shape for diagnostic purposes or to position a data sampler at the best sampling location using a servo loop. A conventional error comparator is usually able to sample any point in the eye. An error comparator typically uses a data sampler that has a large threshold voltage range (e.g., one that can cover for the sum of random offsets, target threshold voltage, and first tap value; voltage range can reach 300-400 mV peak differential).

As data rates increase between a data transmitter and a data receiver, bit duration (also referred to as a unit interval or UI) gets smaller; and smaller UIs reduce allowed timing errors within a data receiver. Higher data rates also means that overall, a data receiver has to perform operations faster. Half-rate and quarter-rate data sampling (by a data sampler) may be used to reduce speed requirements of the clocking generation and distribution inside a receiver. For example, in a half-rate data receiver, two clock signals spaced 180° apart may be used, where each clock signal's rising edge causes sampling of one incoming bit from a received data signal. Usually, for a half-rate data receiver, twice as many clock signals running at half the line rate speed are required. In comparison, in a quarter-rate data receiver, four clock signals spaced 90° apart may be used, where each clock signal's rising edge causes sampling of one incoming bit from a received data signal. Usually, for a quarter-rate data receiver, four times as many clock signals running at a quarter of the line rate speed are required. Additionally, another set of complementary clock signals in quadrature can be used to sample transitions (e.g., detect edges). A quarter-rate data receiver is often used for high-rate data links, such as those operating at 32 Gbps.

Conventional data receivers are known to use a DFE (which is a non-linear equalizer) to compensate for intersymbol interface (ISI) present within a received data signal (e.g., received from a data transmitter). Specifically, a DFE may use a data sampler to determine (e.g., make a decision on) a value of an incoming bit of a received data signal (e.g., thereby quantizing the received data signal) for a current UI, may obtain a value of a preceding bit (e.g., value of bit from one UI before) via a first tap of the DFE, may scale the value of the preceding bit by a coefficient (e.g., tap weight) associated with the first tap, and may apply the scaled value to a next incoming bit of the received signal by adding the scaled value to, or subtracting the scaled value from, the received signal via an analog summer. Generally, where only DFE-based equalization is used at a data receiver, the one or more tap weights (associated with the different taps) of the DFE would equal the non-equalized channel pulse response values for the incoming data signal (e.g., [a1, a2, . . . an]).

In conventional data receivers that use a direct-feedback DFE, a first tap of the DFE is expected to settle within one UI (which can represent one-bit period). However, at high data rates, closing the timing of a first tap of the DFE (with direct feedback) is usually not possible. For instance, at a data rate of 32 Gpbs, operations of a data sampler of a DFE, a feedback tap-weighting component of the DFE, and an analog summer (e.g., summing node) of the DFE should settle within 31.25 ps (which represents one UI for a data link rated at 32 Gpbs) for the DFE to properly operate. Given that current fabrication technologies do not enable a DFE to meet such a timing requirement (e.g., a UI of 31.25 ps is too small to permit a DFE to feedback and add/subtract ISI to a next bit of the received data signal), conventional data receivers often use a DFE with first tap loop unrolling. For example, the loop of the first tap of a one-tap DFE can be "unrolled" such that the feedback tap-weight component and analog summer for the first tap are replaced with a multiplexer (MUX) and two different data samplers (with different threshold voltages) are used to pre-compute two possibilities for the incoming bit of the received data signal at a current UI. Depending on the implementation, more than one tap loop of a DFE may be unrolled, with the number of data samplers increasing exponentially based on the number of unrolled taps (e.g., 2N, where N represents the number tap loops unrolled).

As noted, conventional data receivers may operate at half or a quarter of a bit rate. For instance, clock recovery circuits within conventional data receivers generate sampling clock signals used by a DFE. Some clock recovery circuits generate many sampling phases and, as such, this makes them suitable for quarter-rate applications that include a quarter-rate DFE. One of the issues with conventional quarter-rate DFEs is that they multiplex the output of the four data sampling heads into a single data stream to perform the current feedback. At high data rates, this multiplexing operation eats up timing margins needed to perform feedback of the tap currents of the DFE. Another issue with conventional quarter-rate DFEs is that they generally use twice as many data samplers as conventional half-rate DFEs, which also increases capacitive loading observed by summer (e.g., summing nodes) within the conventional DFEs. This issue is further exacerbated by the fact that clock recovery using a quarter-rate DFE involves sampling an incoming data signal using four data samplers to acquire data at center of data bits, and using another set of four data samplers to identify where bit transitions (e.g., edges) exist; this doubles the number of data samplers needed, further increasing the load on a summer. Further, at higher data rates (e.g., above 16 Gbps), achieving direct feedback for a first DFE tap can be difficult as the propagation delay around the DFE loop would need to be smaller than a single UI to operate appropriately. Furthermore, a conventional half-rate two-tap DFE with a first tap unrolled can still run into timing limitations at high data rates, such as 32 Gbps. In particular, for such a conventional DFE, applying feedback based on the first tap would need to settle within one UI period (e.g., 31.25 ps), and applying feedback based on the second tap would need to settle within two UI periods (e.g., 62.5 ps), which can entail the first tap selection value arriving not much later than one UI after the previous bit gets sampled; any extra delay in that sense can reduce the effective time allowed for the second tap to settle. With the first tap unrolled, the second tap may be the one that takes the most time to settle because it directly depends on sampler resolution time (e.g., data sampler propagation delay usually eats up most of a tap settling timing budget and is exponentially proportional to voltage overdrive at the data samplers' input). Unfortunately, such timing may be difficult to achieve by conventional data receivers. A similar issue exists for conventional quarter-rate multi-tap DFEs that use a first tap unrolled, as four-to-one multiplexing operation would be used, which puts even more strain on loop timing closure.

Yet another issue with conventional quarter-rate DFEs is that using direct feedback DFE can interfere with the clock recovery mechanism. For instance, the first tap compensation applied should be different for data samplers used for edge detection and data samplers used for data recovery, as generally data samplers used for data samples and edge samples do not have the same ISI correction needs, as they do not sample the eye at the same position. This may be difficult to implement with direct feedback DFE as it would require different correction voltages for edge and data samples to settle in just half a UI. Additionally, applying DFE correction computed for the data samples (e.g., in the middle of the eye) to the edge samples can result in correlated jitter, which may introduce a pattern sensitivity in the clock recovery. Furthermore, direct feedback DFE may introduce non-linear transients due to current switching that can significantly shift the eye centering.

As used herein, a data sampler may include a data slicer (or slicer) that may refer to an edge triggered device configured to sample a signal on a rising edge of a clock signal and reset when the clock signal is low.

As used herein, a tap coefficient with a first polarity (e.g., +H) can comprise a positive or a negative value, and the (same) tap coefficient with a second polarity (e.g., −H) can comprise a positive value or negative value. For some embodiments, a tap coefficient with a first polarity and the tap coefficient with a second polarity are such that the first and second polarities are opposite polarities. For instance, for some embodiments, a first-tap coefficient (e.g., H1) with a first polarity (e.g., +H1) and the first-tap coefficient (e.g., H1) with a second polarity (e.g., −H1) are complementary values, where the two coefficients have the same absolute value but complementary polarity.

Reference will now be made in detail to embodiments of the present disclosure, examples of which are illustrated in the appended drawings. The present disclosure may, however, be embodied in many different forms and should not be construed as being limited to the embodiments set forth herein.

As discussed above, some existing techniques may use loop unrolling for the first tap. This technique may be used to ensure that the first tap output may be within one UI. This technique requires twice the number of slicers as compared to direct DFE feedback, which increase the amount of power and area required. In direct DFE, 1UI time is divided into two parts, which include sum-amp node settling and sampler clock to Q delay. As technology shrinks the routing parasitic resistance is increasing and the routing parasitic capacitance is decreasing. The sampler becomes faster as there may be a lesser clock to Q delay. However, the sum-amp node settling time may take a long time, for example, it may take a maximum time in the available 1UI time. As the number of taps increases, this settling time also increases due to the routing load.

In existing systems, a quarter rate architecture may be used and a minimum of two sum amplifiers and a two-tap network may be required. Accordingly, and referring now to FIGS. 1-20, embodiments of the present disclosure provide a direct DFE feedback architecture that eliminates the need for loop-unrolling. The number of slicers required may be reduced significantly as compared to loop-unrolling for the first tap correction, which may reduce both the area and power required for the slicers. The architecture included herein may reduce the loading at the sum amplifier. A quarter rate clocking may be used for the slicers, which may reduce the loading in the phase interpolator design by reusing the same phase interpolator.

Embodiments of the present disclosure provide numerous advantages over existing approaches. For example, eight slicers may be required as opposed to sixteen in existing techniques (e.g., four slicers for D-path (loop unrolling uses eight D-path slicers and four slicers for Q-path (loop unrolling use eight Q-path slicers)). One among the four Q-path slicers may be time-interleaved as error sampler.

Referring now to FIG. 1, circuit 100 is provided showing an example quarter rate digital feedback equalization architecture consistent with embodiments of the present disclosure. Circuit 100 may include two sum amplifiers and a two-tap network. Tap-1 may be unrolled and Tap-2 may be fed back to the tap network. Also, 4-phase clocks are shown, which may be used with the quarter rate architecture. In some embodiments, for each phase two data slicers may be used for Tap-1 unrolling. As such, 8 data slicers and 8 Q/E slicers may be used resulting in 16 total slicers for some Tap-1 unrolled quarter rate DFE architectures. In the embodiments included hereinbelow, only one data path may be provided in order to reduce complexity in the diagrams.

Figure 2:
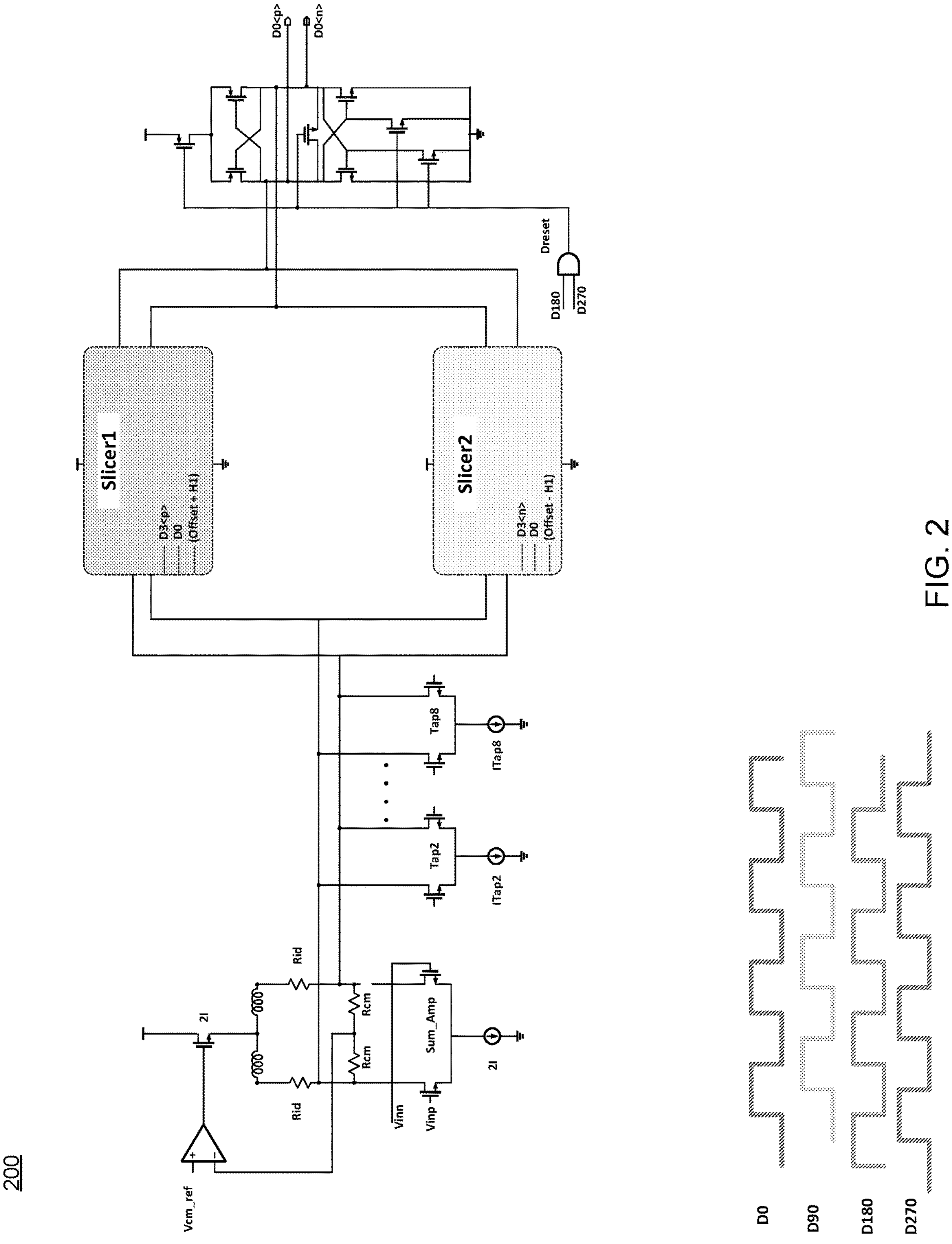
FIG. 2 shows an example unrolled slicer architecture with a sum amplifier and tap network consistent with embodiments of the present disclosure.

Referring now to FIG. 2, an example unrolled slicer circuit 200 consistent with embodiments of the present disclosure is provided. Circuit 200 may include a sum amplifier and tap network, slicers (only the DO data path is shown in FIG. 1) and regen block. Four phase clocks (90 deg phase apart) are shown. DO clock is the sampling clock phase for slicer-1 and slicer-2. Two slicers may be required for precomputing data for two possible previous bits and accordingly offset+/–H1 code is different for two possible previous bit. The last stage of the slicers may be muxed and based on the previous bit (D3<p>, D3<n>), one of the slicer outputs drive the regen block.

Figure 3:
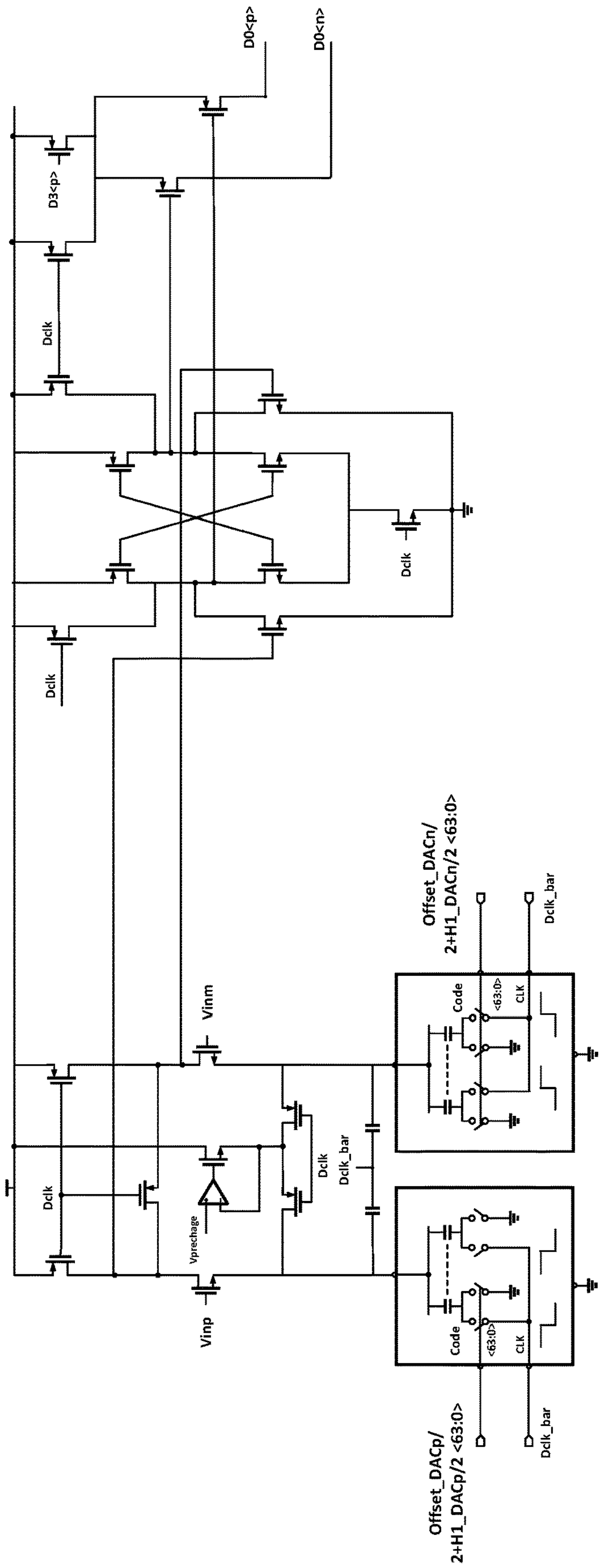
FIG. 3 shows an example unrolled slicer architecture consistent with embodiments of the present disclosure.

Referring now to FIG. 3, an example unrolled slicer architecture 300 consistent with embodiments of the present disclosure is provided. This is the slicer architecture (e.g., slicer-1 in FIG. 2), showing both CapDACs, connected at the source of the sampler. The output is based on "Offset+H1" code and the last stage is the multiplexer, drive the outputs (D0<p> and D0<n>) based on by previous data (D3<p>).

Figure 4:
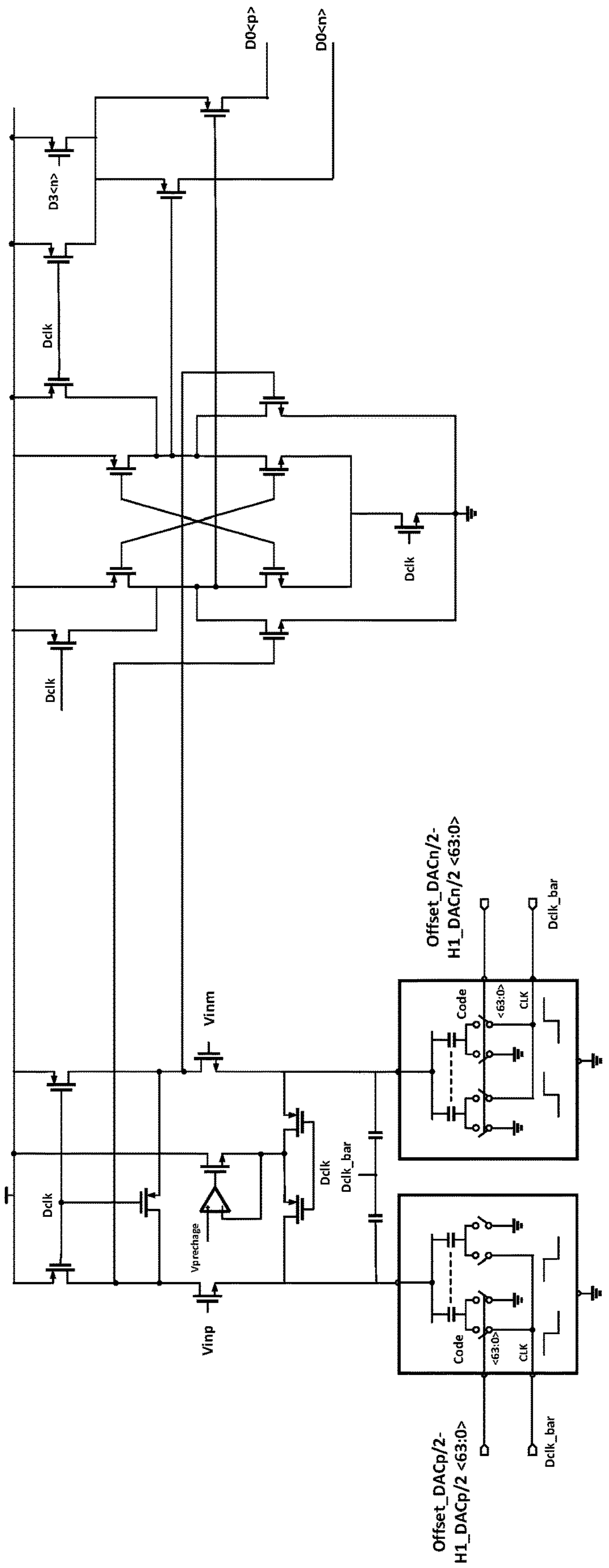
FIG. 4 shows another example unrolled slicer architecture consistent with embodiments of the present disclosure.

Referring now to FIG. 4, an example unrolled slicer architecture 400 consistent with embodiments of the present disclosure is provided. This is the slicer-2 architecture as shown in FIG. 2. This is similar to slicer-1 as shown in in FIG. 3, however the CapDAC's code, its "Offset-H1" and last stage drive the outputs (D0<p> and D0<n>) based on opposite previous data (D3<n>).

Figure 5:
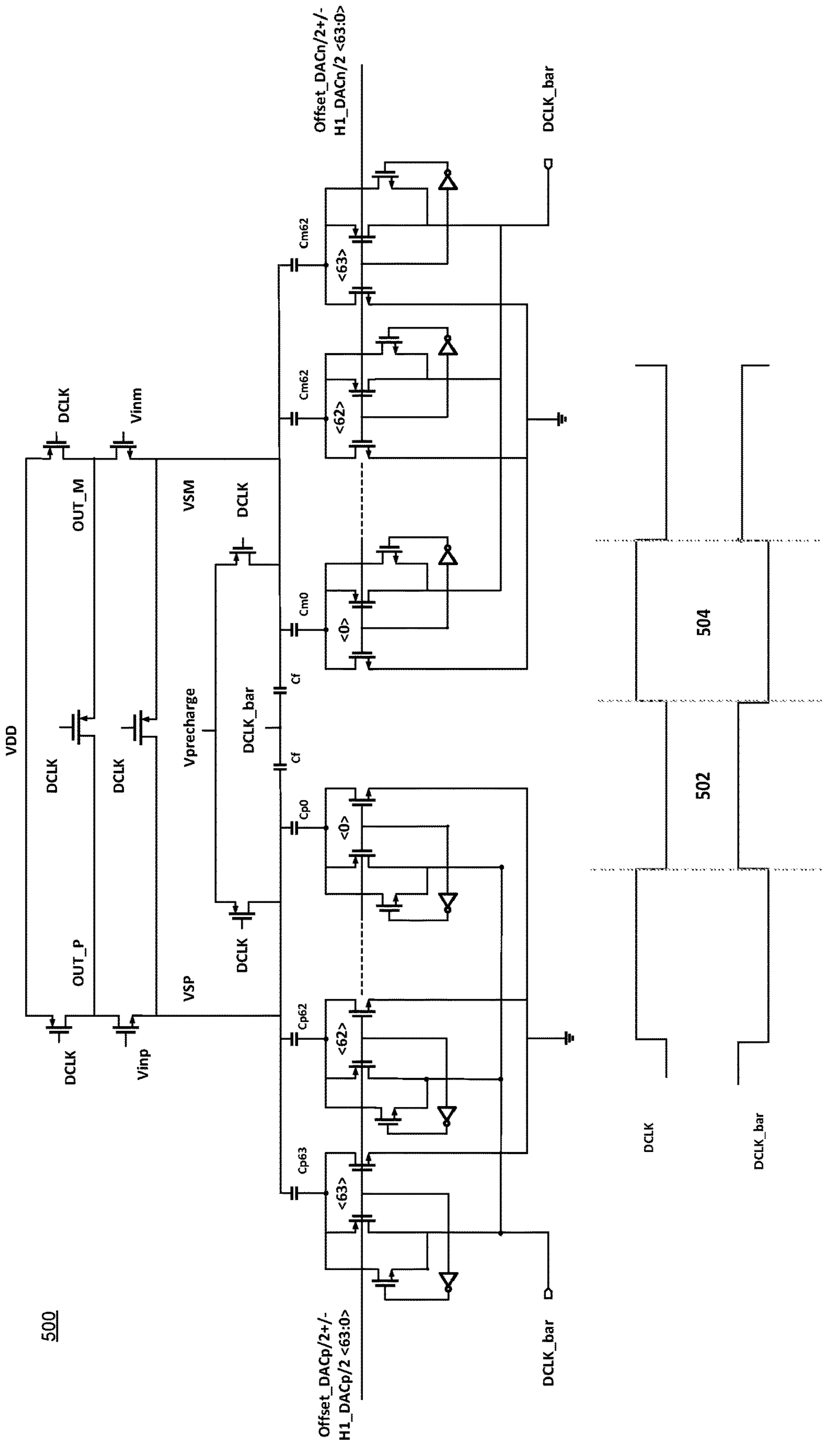
FIG. 5 shows an example first stage of an unrolled slicer architecture consistent with embodiments of the present disclosure.

Referring now to FIG. 5, an example first stage of an unrolled slicer architecture 500 consistent with embodiments of the present disclosure is provided. This example shows the 1st stage of the slicer, focusing on the CapDAC network, and provides an example that indicates how the capacitors may be selected based on the codes (offset+/–H1) and how the voltage difference may be generated at the source. Here, the +/–H1 code is for considering the Tap-1 coefficient and the "offset" code is for the sampler's offset cancellation. For a Tap-1 unrolling architecture, +H1/–H1 may be added with an offset code and two slicers having input "offset+H1" and "offset–H1" code generating output. Both outputs may be muxed by the previous bit at the last stage of the slicers. Please note the following annotations when reviewing the unrolled slicer architecture 500: precharge voltage $V_p$, fixed capacitance $C_f$, and total capacitance $C_t$ (where $C_t=C_{p0}+C_{p1}+ \ldots +C_{p63}=C_{m0}+C_{m1}+ \ldots +C_{m63}$). Further, in a precharge phase 502, $V_{vsp}=V_{vsm}=V_p$, such that $V_{vsp}-V_{vsm}=0$, and in a sampling phase $$504\ V_{vsp} = V_p - V_{dd}\left(\frac{C_f + C_p}{C_t + C_f}\right),$$

$$V_{vsm} = V_p - V_{dd}\left(\frac{C_f + C_m}{C_t + C_f}\right), V_{vsp} - V_{vsm} = V_{dd}\left(\frac{C_m - C_p}{C_t + C_f}\right).$$

Figure 6:
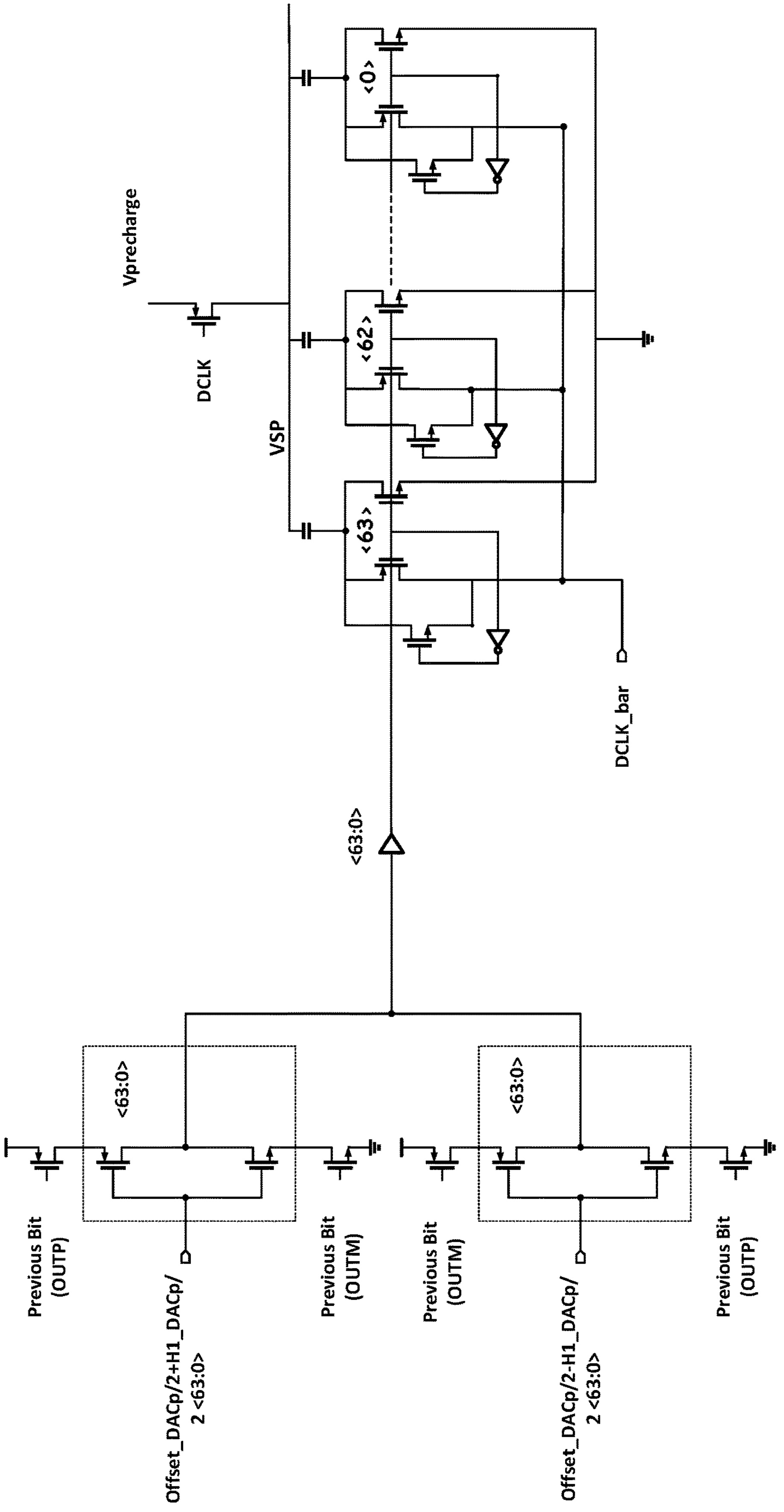
FIG. 6 shows an example P-side of a slicer architecture consistent with embodiments of the present disclosure.

Referring now to FIG. 6, an example P-side of a slicer architecture 600 consistent with embodiments of the present disclosure is provided. This example shows a P-side CapDAC network, which has been modified (from an existing CapDAC as shown in FIG. 5) for a non-unrolled architecture. There is no separate decision making for two possible previous bits like direct DFE (separate decision making for two possible previous bits was performed in unrolled-DFE) but the Tap1 feedback may be different than direct DFE. For example, here the feedback is not to the tap network but to the CapDAC network. Code selection may be performed between "Offset+H1" and "Offset–H1" by previous bits (OUTP and OUTM). This architecture may operate similarly to the examples above, however, the codes that are connected to the CapDAC switches are not static but changing based on previous bits.

Figure 7:
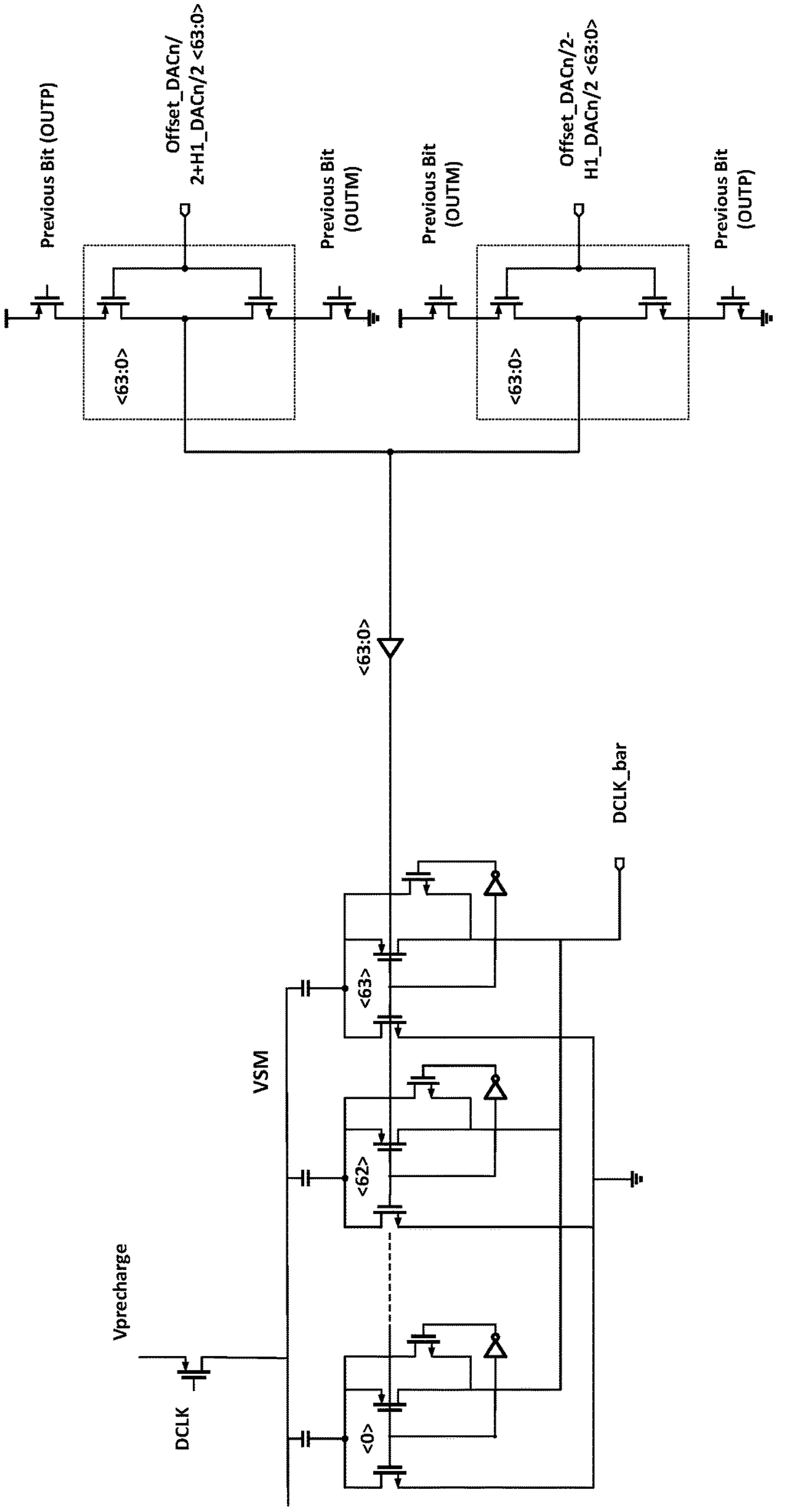
FIG. 7 shows an example N-side of a slicer architecture consistent with embodiments of the present disclosure.

Referring now to FIG. 7, an example N-side of a slicer for a non-unrolling architecture 700 consistent with embodiments of the present disclosure is provided. This example shows the N-side of a CapDAC network. This is similar to the P-side CapDAC in FIG. 6; however the input codes may differ.

Figure 8:
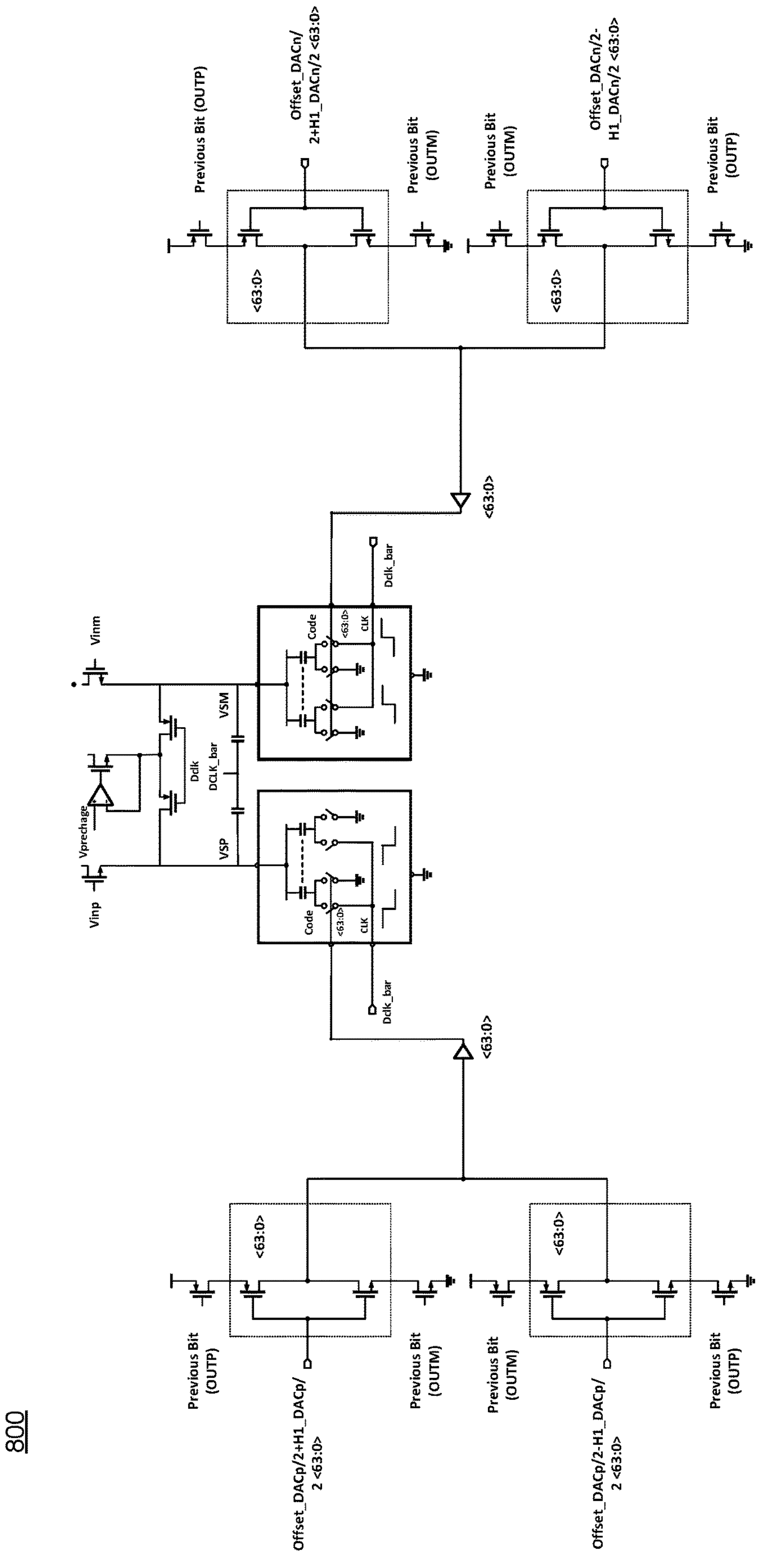
FIG. 8. shows an example modified P-side and N-side consistent with embodiments of the present disclosure.

Referring now to FIG. 8, an example modified P-side and N-side CapDAC for a non-unrolling architecture 800 consistent with embodiments of the present disclosure is provided. This example shows a portion of a modified slicer with highlighting both P-side and N-side CapDAC network as shown in FIGS. 6-7.

Figure 9:
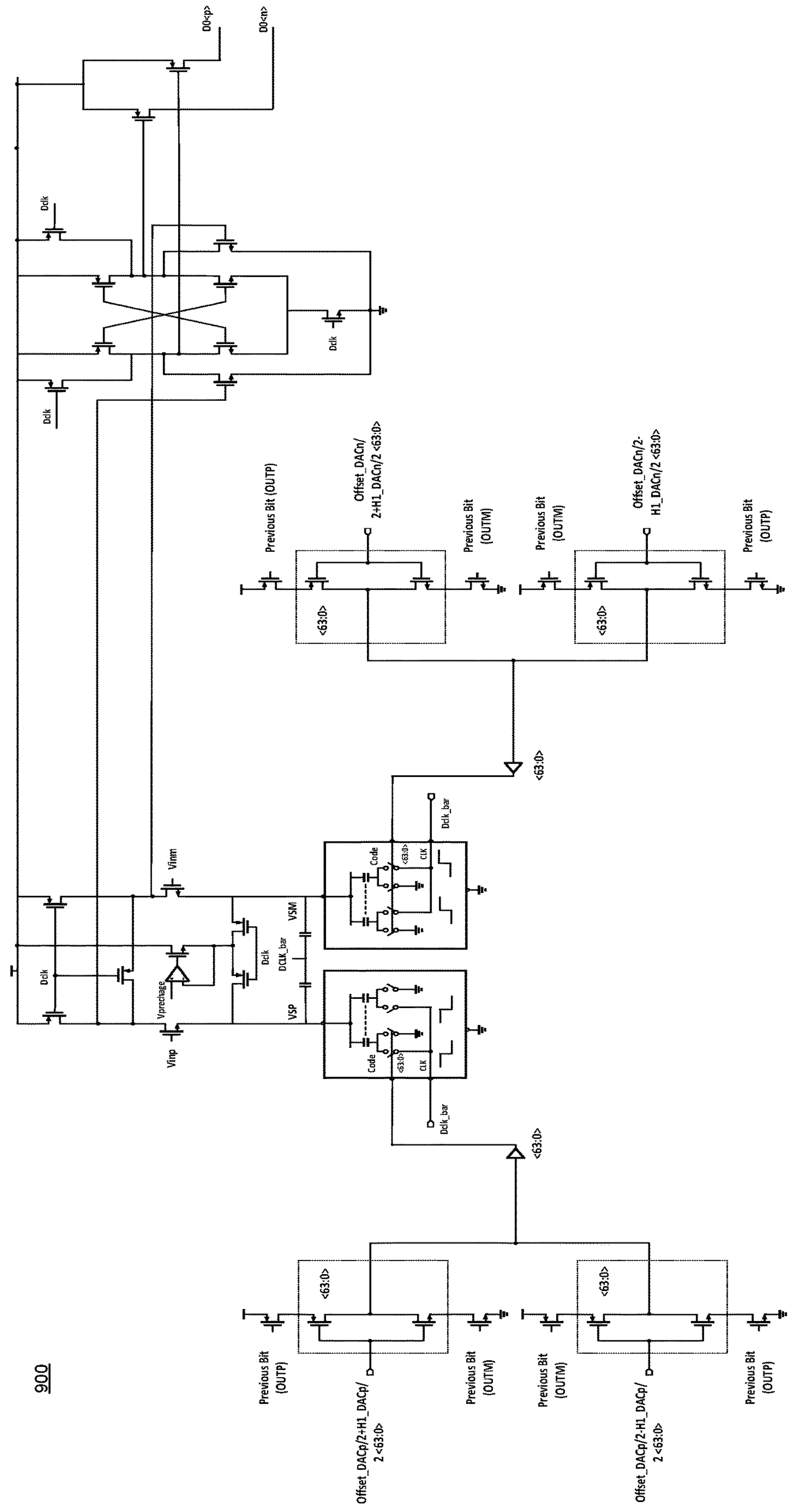
FIG. 9 shows an example non-unrolled slicer consistent with embodiments of the present disclosure.

Referring now to FIG. 9, an example non-unrolled slicer architecture 900 consistent with embodiments of the present disclosure is provided. This example shows a modified slicer with an added modified CapDAC network as shown in FIGS. 6-8, where extra logic may be included to select code by previous bits. No muxing is required at the last stage.

Figure 10:
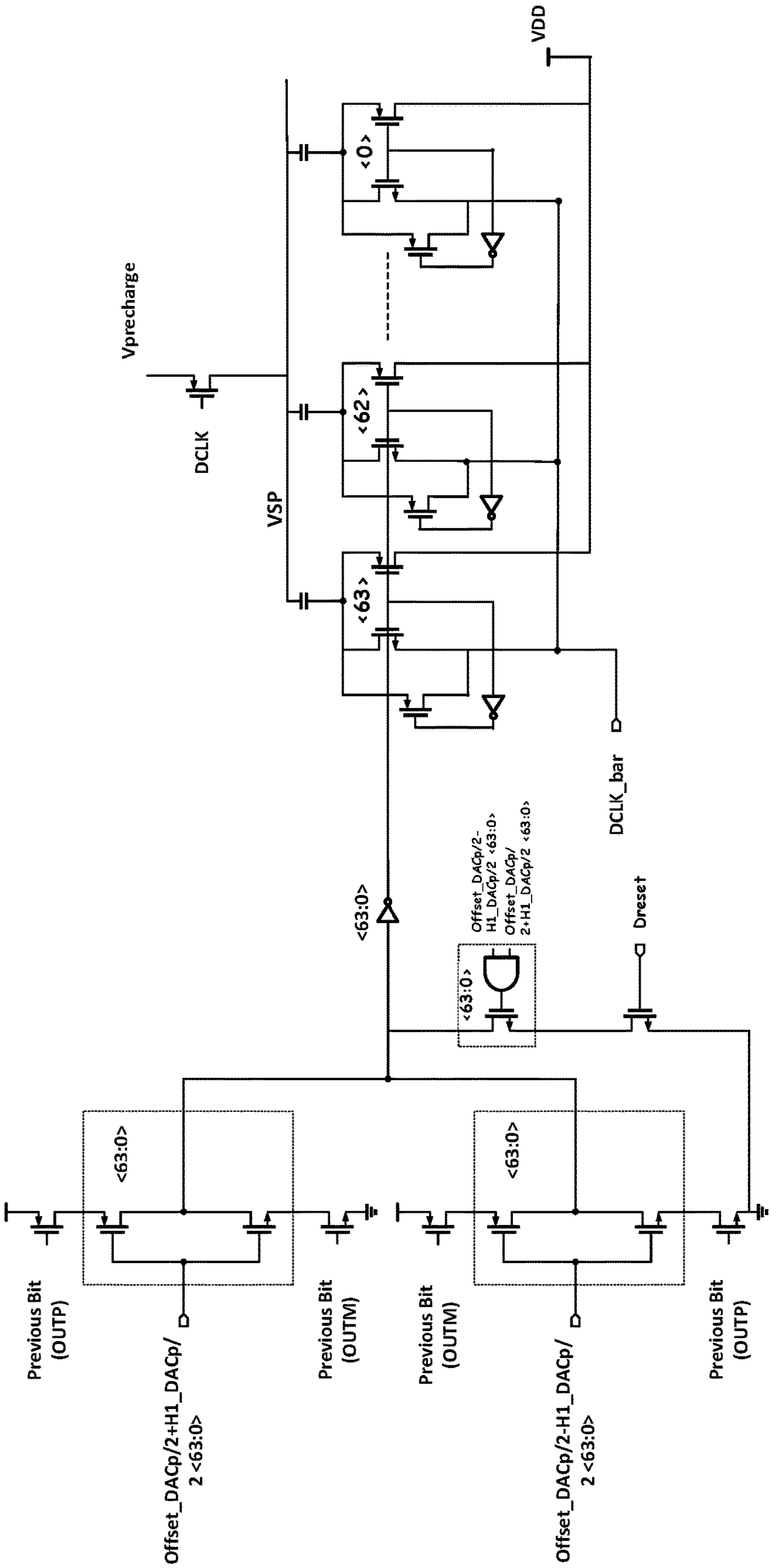
FIG. 10 shows an example P-side slicer for a non-unrolling architecture consistent with embodiments of the present disclosure.

Referring now to FIG. 10, an example P-side slicer for a non-unrolling architecture 1000 consistent with embodiments of the present disclosure is provided. This example shows another further modification in the CapDAC network (e.g., the Pside CapDAC shown in this figure). In the reset phase (D180=1, D270=1) before DO positive edge, both outputs may be reset to "0" and in that phase some of the outputs of the multiplexer (e.g., the input of the inverter during cap switches) may be floated (if offset+H1<n>=1 & offset–H1<n>=1). To address this issue in the reset phase one or more floated outputs may be connected to ground and extra logic gates may be added to support this. Also, one or more switches inside the CapDAC may be modified to avoid unwanted switching on the bottom plate of caps inside CapDAC as shown in the Figure. In some examples, bottom plate capacitors may be connected to either VDD through PMOS (instead of VSS through NMOS) or DCLK_Bar depending on the selected codes based on previous bits.

Figure 11:
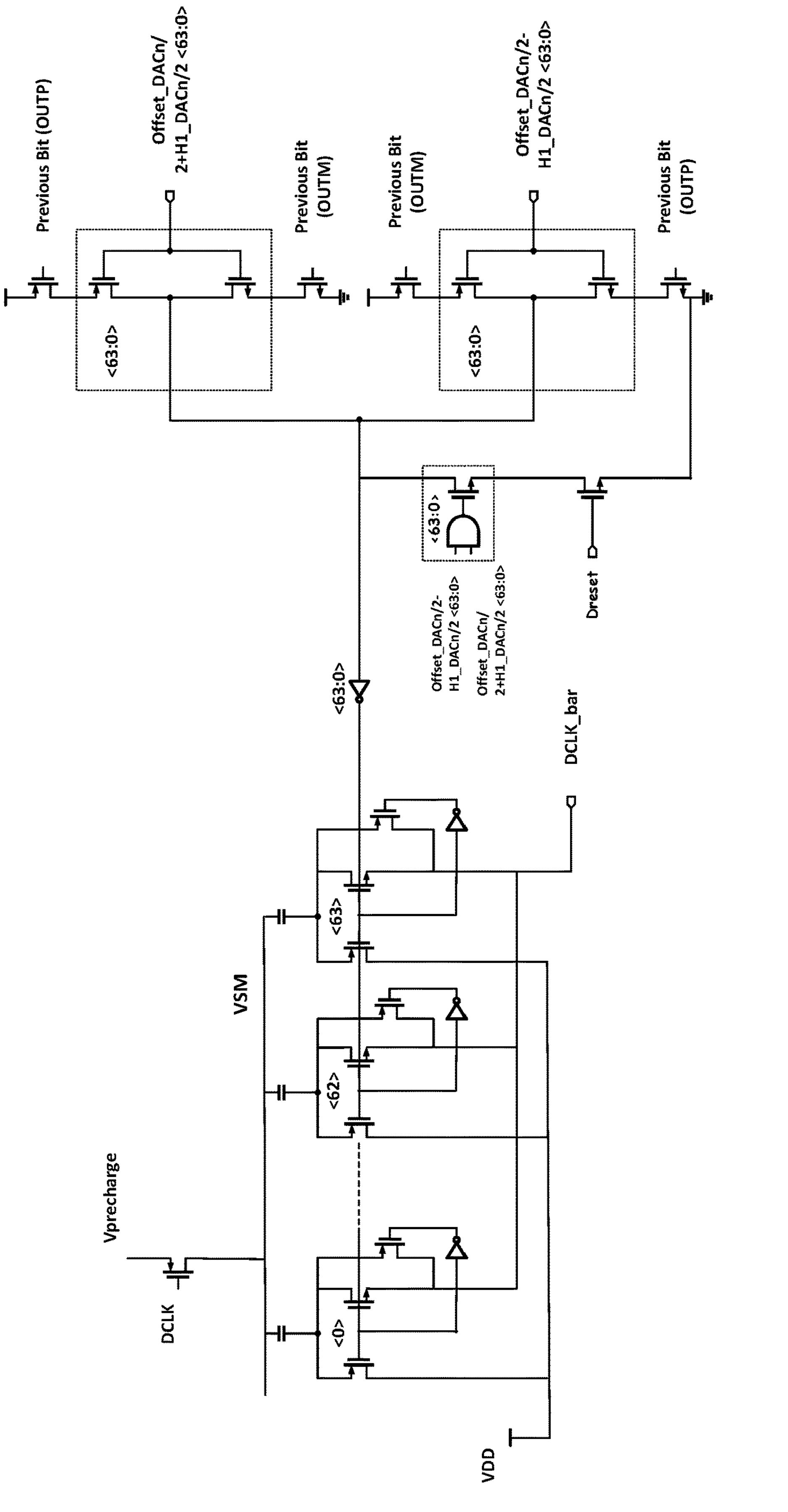
FIG. 11 shows an example N-side slicer for a non-unrolling architecture consistent with embodiments of the present disclosure.

Referring now to FIG. 11, an example N-side slicer for a non-unrolling architecture 1100 consistent with embodiments of the present disclosure is provided. This diagram shows the N-side of a CapDAC network, similar to the P-side CapDAC, only the input code may be different.

Figure 12:
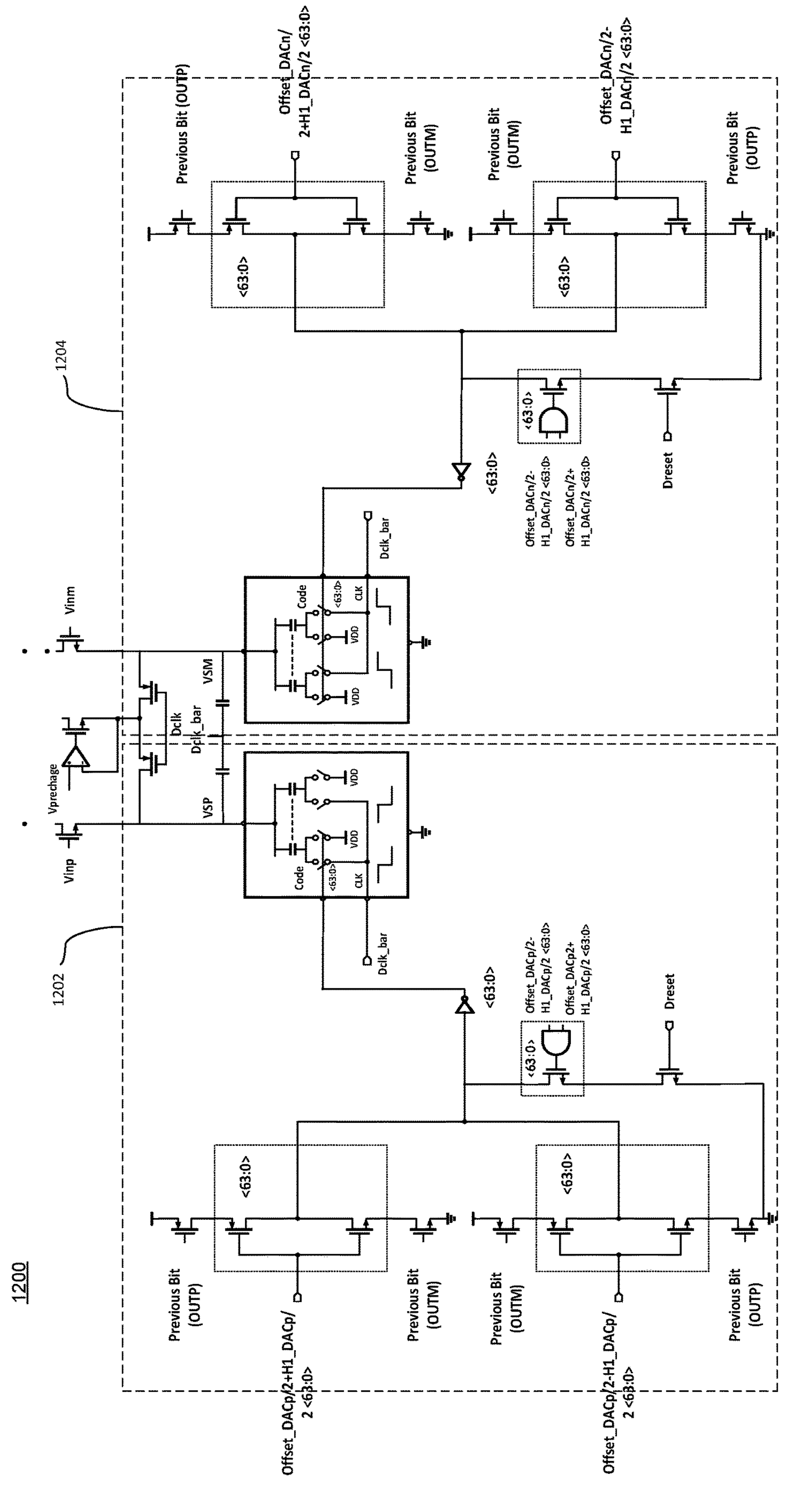
FIG. 12 shows an example P-side and N-side slicer for a non-unrolling architecture consistent with embodiments of the present disclosure.

Referring now to FIG. 12, an example of a non-unrolling architecture 1200 having a P-side 1202 and a N-side 1204 CapDAC consistent with embodiments of the present disclosure is provided. This example shows a portion of a modified slicer with highlighting both P-side 1202 and N-side 1204 CapDAC network as shown in FIGS. 10-11.

Figure 13:
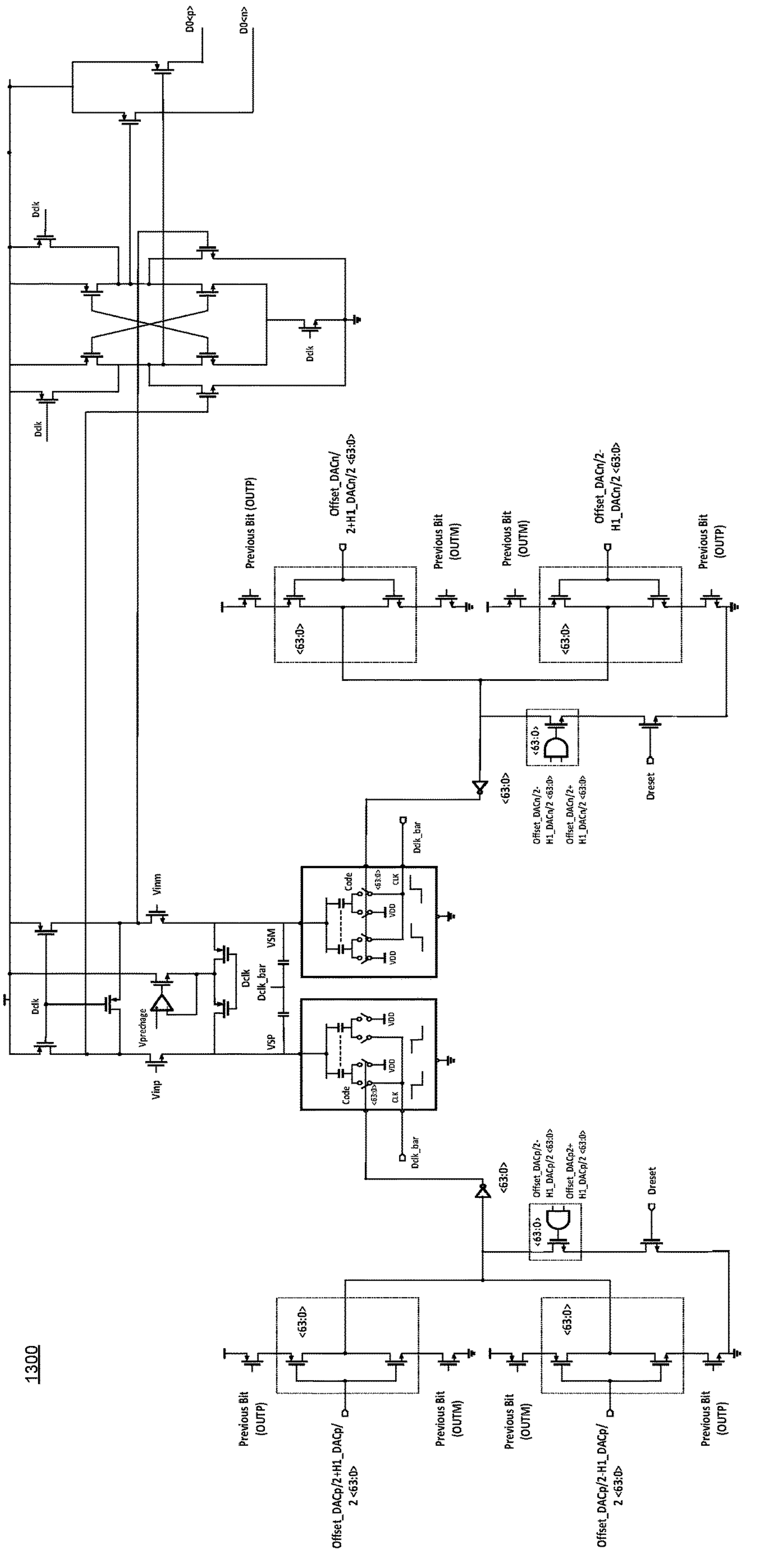
FIG. 13 shows an example non-unrolled slicer architecture consistent with embodiments of the present disclosure.

Referring now to FIG. 13, an example non-unrolled slicer architecture 1300 consistent with embodiments of the present disclosure is provided. This diagram shows a modified slicer with the adding modified CapDAC as shown in FIGS. 10-12.

Figure 14:
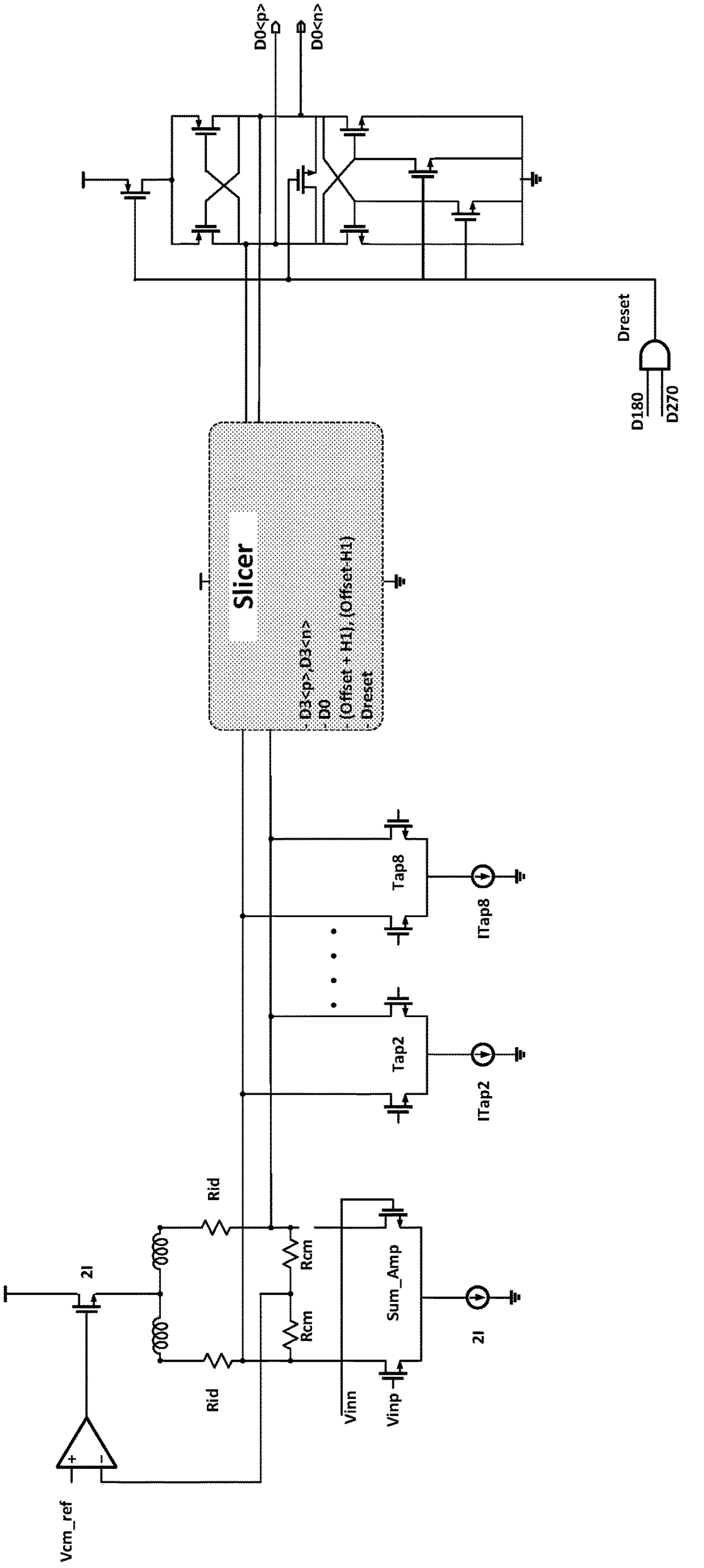
FIG. 14 shows an example non-unrolled slicer architecture with a sum amplifier and tap network consistent with embodiments of the present disclosure.

Referring now to FIG. 14, an example non-unrolled slicer architecture 1400 with a sum amplifier and tap network consistent with embodiments of the present disclosure is provided. This is the complete signal chain showing a sum amplifier, tap network, slicer and regen block. As compared with FIG. 2, in this example only one slicer is needed to generate D0<p> and D0<n> data. Accordingly, the total number of slicers may be halved and the loading at sum amplifier node may be reduced.

Figure 15:
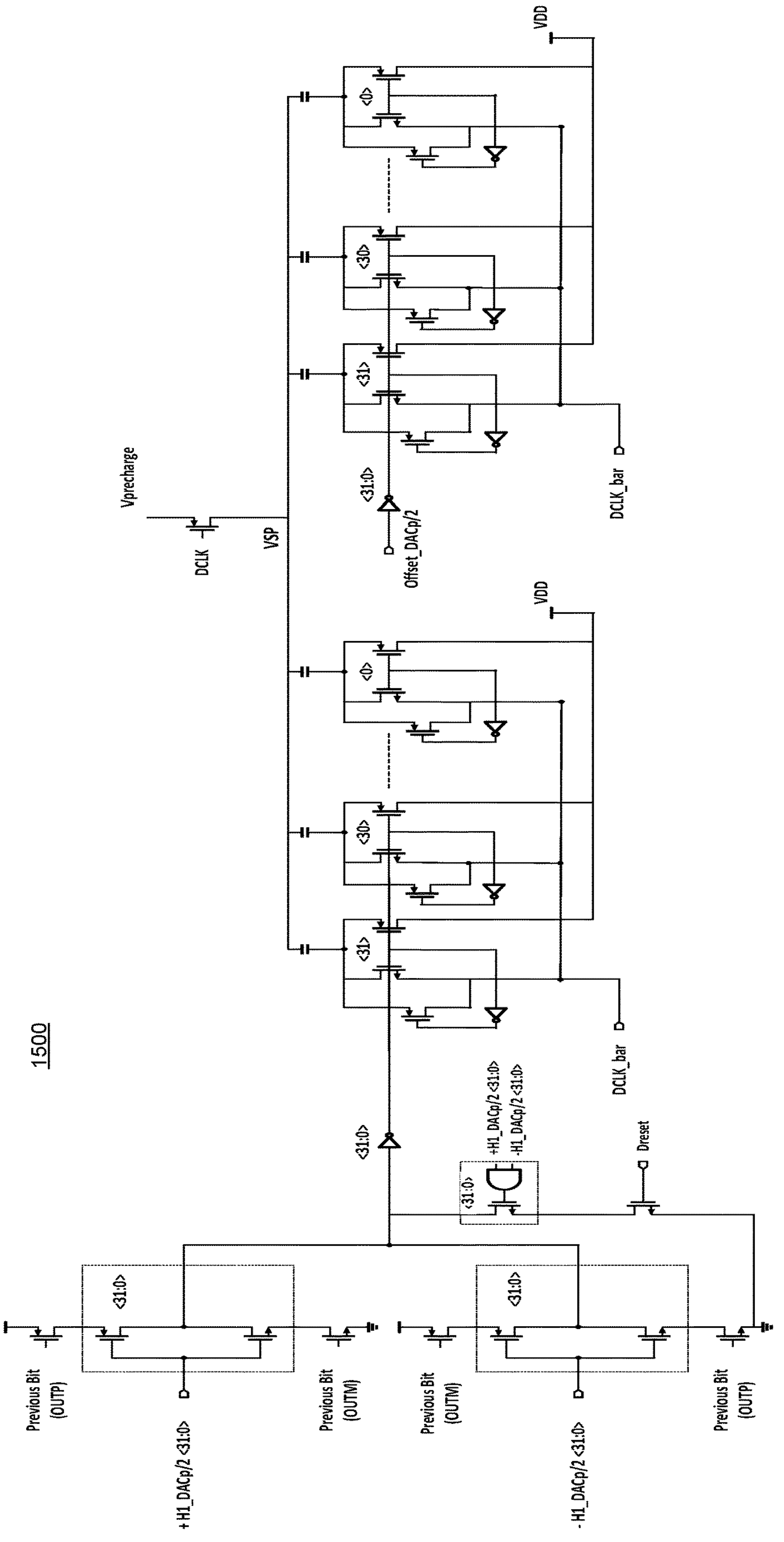
FIG. 15 shows an example P-side slicer for a non-unrolled architecture consistent with embodiments of the present disclosure.

Referring now to FIG. 15, an example P-side slicer for a non-unrolled architecture 1500 consistent with embodiments of the present disclosure is provided. This example shows another further modification in CapDAC from the CapDAC of FIGS. 10-11 (e.g., here only the Pside of the CapDAC is shown). Here, the capacitors may be separated to consider offset cancellation and tap coefficient separately. For offset cancellation, offset codes may be directly fed to the CapDAC and no muxing may be required by previous data. For tap coefficients the CapDAC part may be similar to FIGS. 10-11, here only +/−H1 code (instead of code "offset+/−H1") is fed. In order to generate codes separately the existing DA interface may be different.

Figure 16:
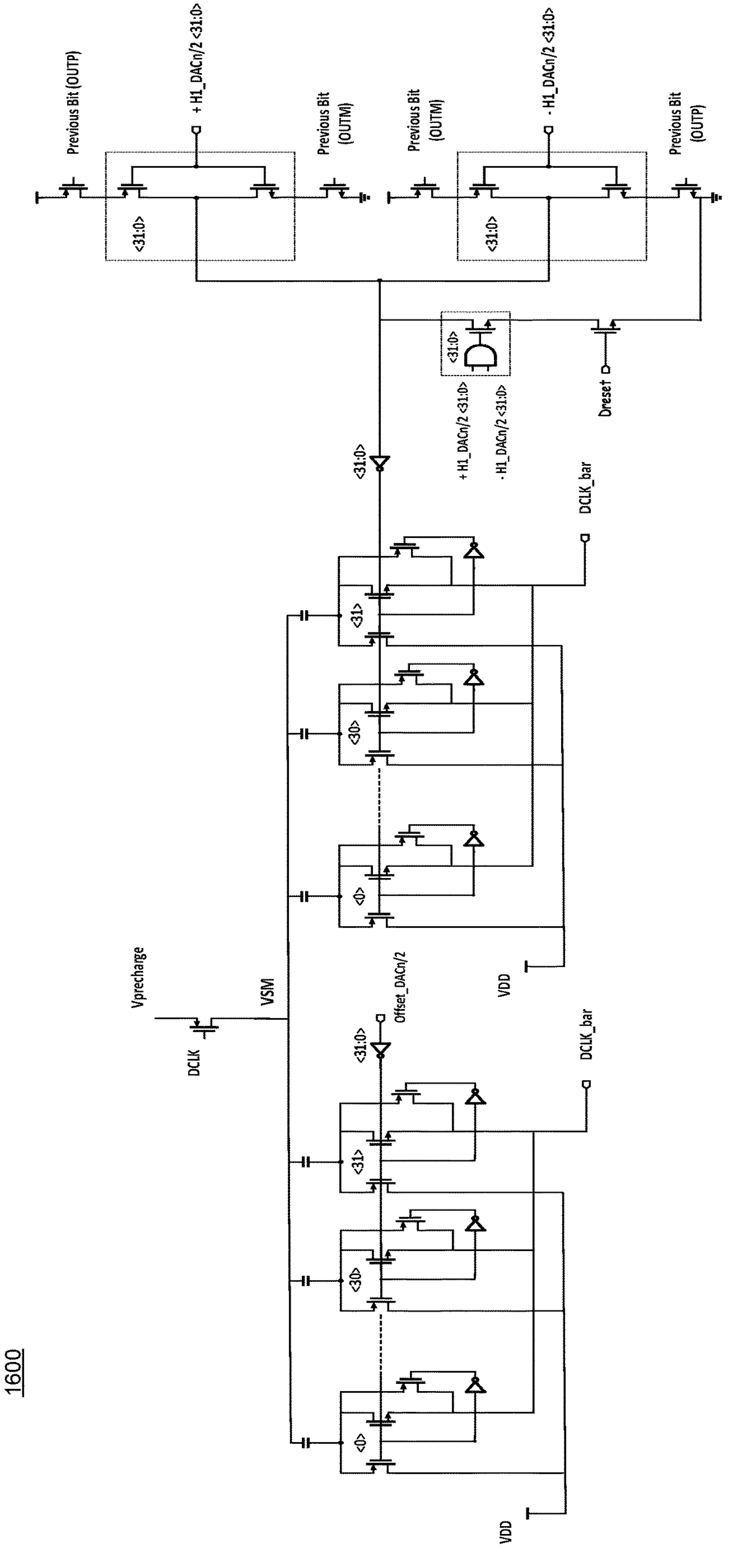
FIG. 16 shows another example P-side slicer for a non-unrolled architecture consistent with embodiments of the present disclosure.

Referring now to FIG. 16, an example N-side slicer CapDAC modification for non-unrolling architecture 1600 is provided. This example is an N-side CapDAC network, similar to the P-side CapDAC network of FIG. 15, only the input codes may be different.

Figure 17:
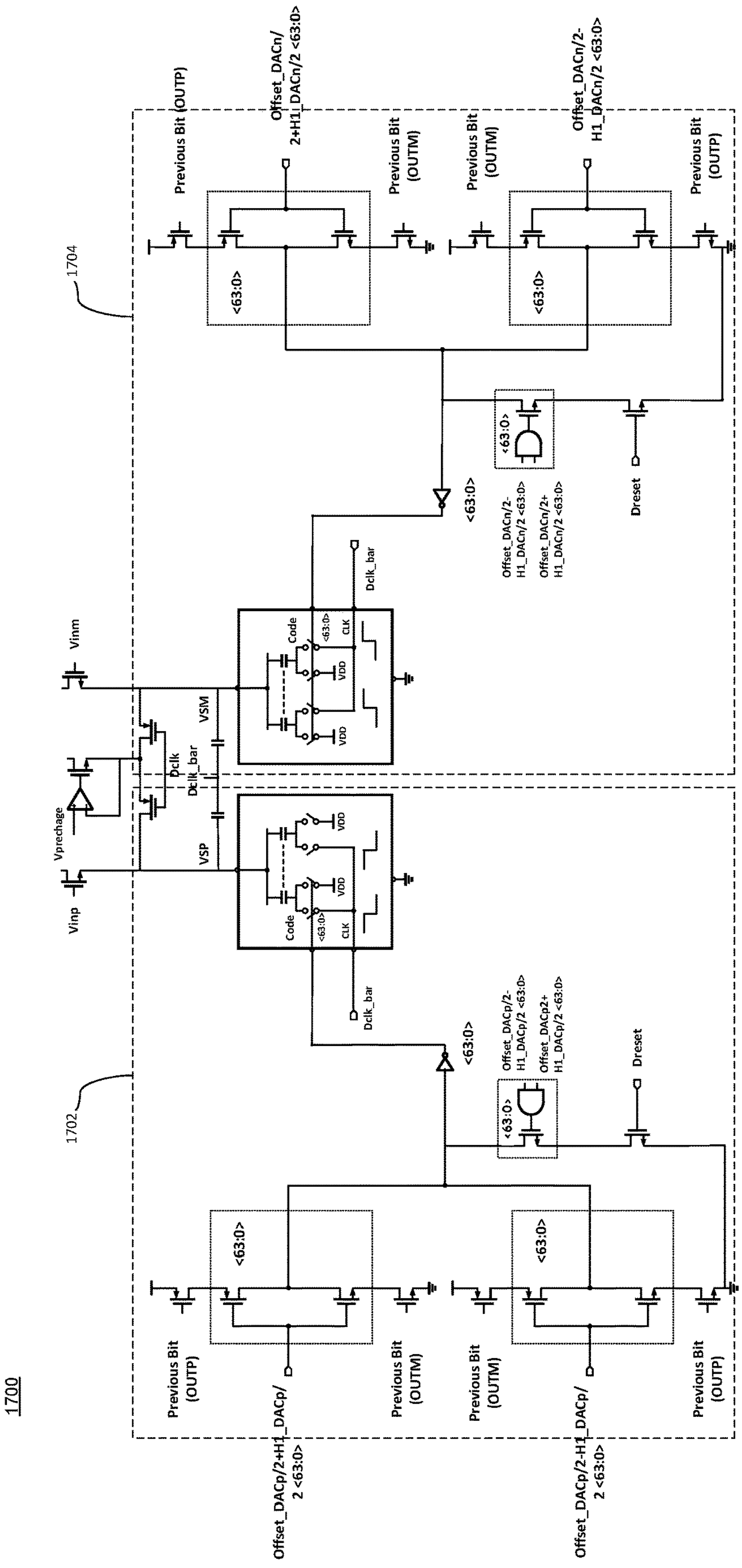
FIG. 17 shows an example P-side and N-side slicer for a non-unrolled architecture consistent with embodiments of the present disclosure.

Referring now to FIG. 17, an example of a non-unrolled architecture 1700 having a P-side slicer 1702 and an N-side slicer 1704 consistent with embodiments of the present disclosure is provided. This example shows part of first stage of a slicer to highlight only the modified CapDAC network (both P-side and N-side) as shown in FIGS. 15-16.

Figure 18:
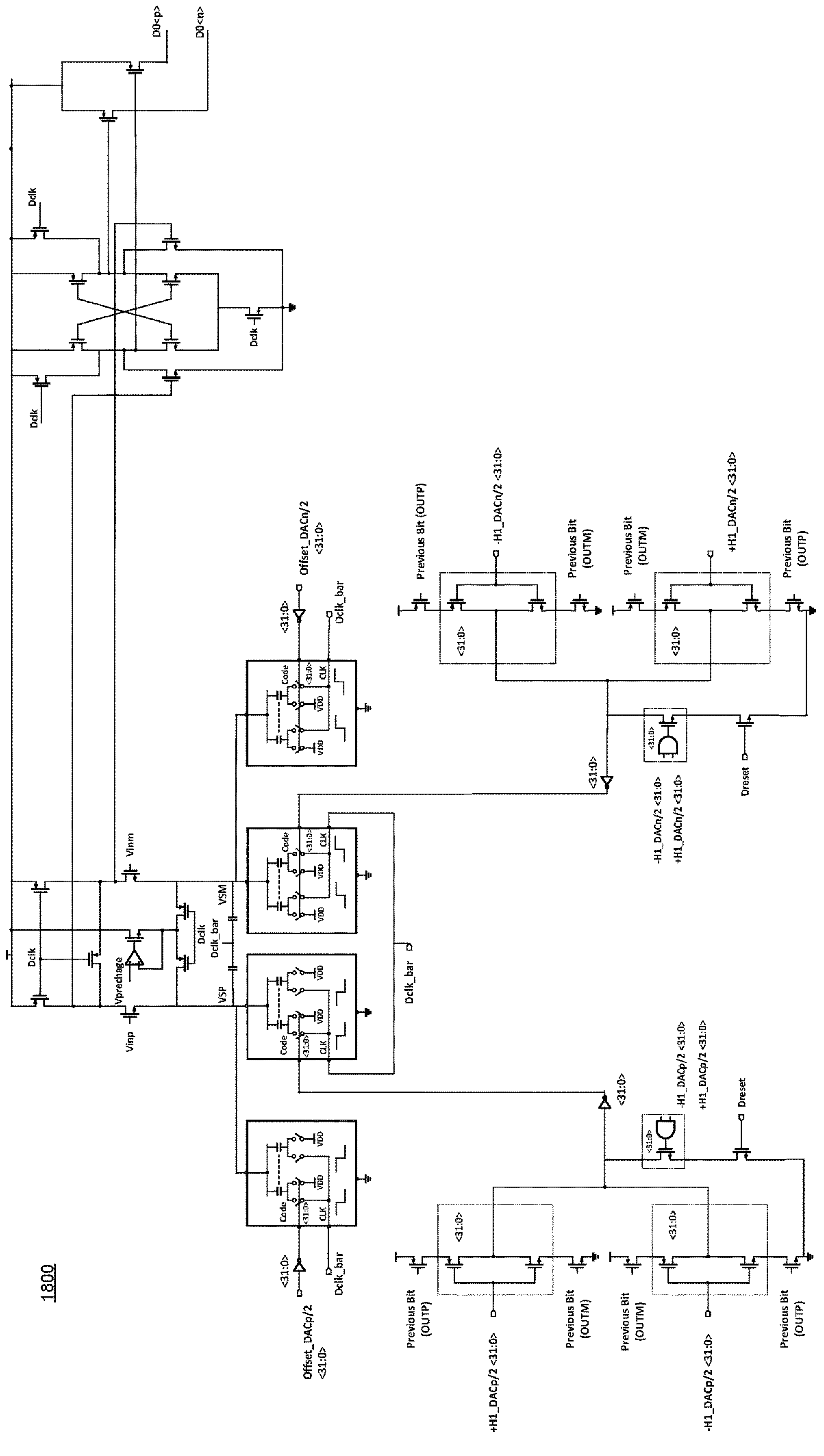
FIG. 18 shows an example non-unrolled slicer architecture consistent with embodiments of the present disclosure.

Referring now to FIG. 18, an example non-unrolled slicer architecture 1800 consistent with embodiments of the present disclosure is provided. This example shows the complete slicer with the modified CapDAC network as shown in FIGS. 15-17.

Figure 19:
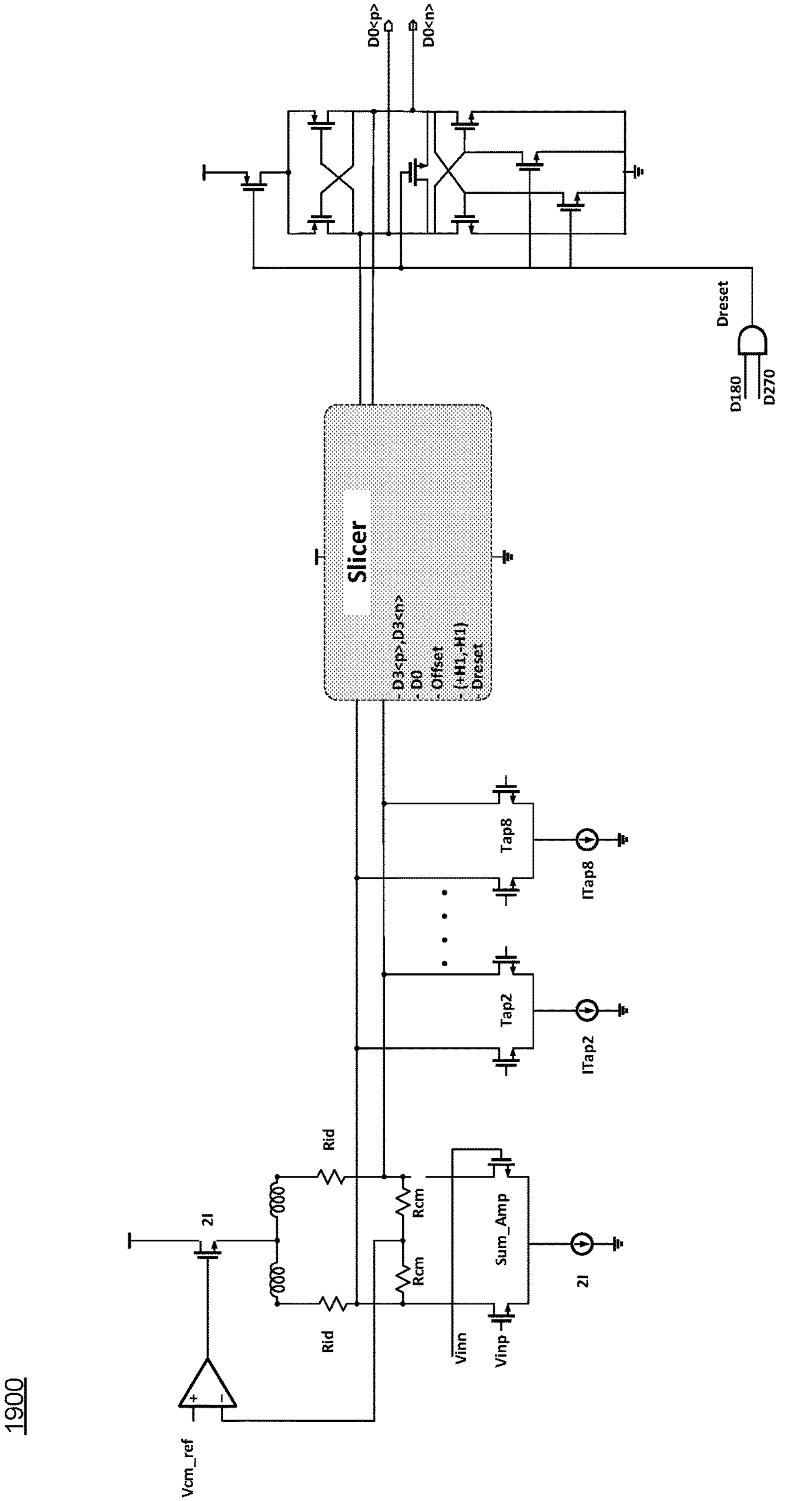
FIG. 19 shows an example non-unrolled slicer architecture with a sum amplifier and tap network consistent with embodiments of the present disclosure.

Referring now to FIG. 19, an example non-unrolled slicer architecture 1900 with a sum amplifier and tap network consistent with embodiments of the present disclosure is provided. This example shows a complete signal chain showing the sum amplifier, tap network, slicer and regen block. This example is similar to that shown in FIG. 14, however the separation of offset code and +H1/−H1 code may be different.

Figure 20:
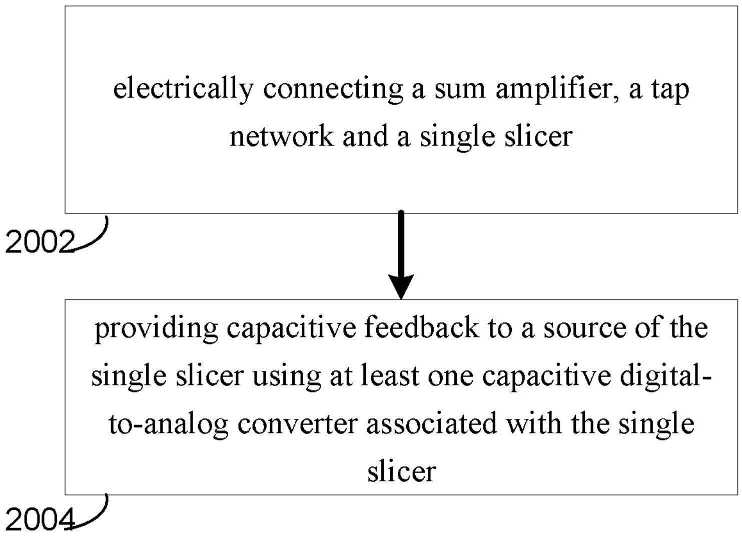
FIG. 20 is a flowchart consistent with an embodiment of the present disclosure.

Referring now to FIG. 20 a flowchart 2000 depicting one or more operations consistent with a decision feedback equalization method of the present disclosure is provided. The method may include electrically connecting 2002 a sum amplifier, a tap network and a single slicer (e.g., a single data and edge slicer for each clock phase instead of two; a total of four data slicers and four edge slicers may be used for all four clock phases with two sum-amplifiers and a two-tap network). The method may further include providing 2004 capacitive feedback to a source of the single slicer using at least one capacitive digital-to-analog converter associated with the single slicer.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A decision feedback equalization circuit, comprising:
- a sum amplifier;
- a tap network in electrical communication with the sum amplifier; and
- a single slicer in electrical communication with the tap network, the single slicer including at least one capacitive digital-to-analog converter configured to provide capacitive feedback to a source of the single slicer, wherein the at least one capacitive digital-to-analog converter includes a P-side capacitive digital-to-analog converter and an N-side capacitive digital-to-analog converter, wherein capacitive feedback is provided to the source of the single slicer without providing feedback to the sum amplifier.

2. The decision feedback equalization circuit of claim 1, wherein the at least one capacitive digital-to-analog converter is configured to select between a first code and a second code based on previously received data.

3. The decision feedback equalization circuit of claim 1, wherein the single slicer utilizes a quarter rate clocking scheme.

4. The decision feedback equalization circuit of claim 1, wherein the at least one capacitive digital-to-analog converter further includes a second P-side capacitive digital-to-analog converter.

5. The decision feedback equalization circuit of claim 4, wherein the at least one capacitive digital-to-analog converter further includes a second N-side capacitive digital-to-analog converter.

6. The decision feedback equalization circuit of claim 1, further comprising: a data path and an edge path.

7. The decision feedback equalization circuit of claim 6, wherein the data path includes four slicers.

8. The decision feedback equalization circuit of claim 7, wherein the edge path includes four slicers.

9. A decision feedback equalization method, comprising:
- electrically connecting a sum amplifier, a tap network and a single slicer; and
- providing capacitive feedback to a source of the single slicer using at least one capacitive digital-to-analog converter associated with the single slicer; and
- providing capacitive feedback to the source of the single slicer without providing feedback to the sum amplifier, wherein the at least one capacitive digital-to-analog converter includes a P-side capacitive digital-to-analog converter and an N-side capacitive digital-to-analog converter.

10. The decision feedback equalization method of claim 9, further comprising:
- selecting between a first code and a second code based on previously received data using at least one capacitive digital-to-analog converter.

11. The decision feedback equalization method of claim 9, wherein the single slicer utilizes a quarter rate clocking scheme.

12. The decision feedback equalization method of claim 9, wherein the at least one capacitive digital-to-analog converter further includes a second P-side capacitive digital-to-analog converter.

13. The decision feedback equalization method of claim 12, wherein the at least one capacitive digital-to-analog converter further includes a second N-side capacitive digital-to-analog converter.

14. The decision feedback equalization method of claim 9, further comprising:
- a data path and an edge path.

15. The decision feedback equalization method of claim 14, wherein the data path includes four slicers.

16. The decision feedback equalization method of claim 15, wherein the edge path includes four slicers.

* * * * *